United States Patent
Maini et al.

(10) Patent No.: US 9,409,533 B2
(45) Date of Patent: Aug. 9, 2016

(54) SYSTEM AND METHOD FOR MONITORING AND CONTROLLING ENERGY SYSTEM

(75) Inventors: Chetan Kumar Maini, Bangalore (IN); Prakash Ramaraju, Bangalore (IN); Nagendra Babu Sathyanarayana, Bangalore (IN)

(73) Assignee: MAHINDRA REVA ELECTRIC VEHICLES PVT. LTD., Bangalore (IN)

( * ) Notice: Subject to any disclaimer, the term of this patent is extended or adjusted under 35 U.S.C. 154(b) by 872 days.

(21) Appl. No.: 13/319,643

(22) PCT Filed: Apr. 30, 2010

(86) PCT No.: PCT/IN2010/000281
§ 371 (c)(1),
(2), (4) Date: Nov. 9, 2011

(87) PCT Pub. No.: WO2010/131262
PCT Pub. Date: Nov. 18, 2010

(65) Prior Publication Data
US 2012/0059526 A1    Mar. 8, 2012

(30) Foreign Application Priority Data
May 11, 2009   (IN) .......................... 1086/CHE/2009

(51) Int. Cl.
*G06F 1/26* (2006.01)
*B60R 16/03* (2006.01)
(Continued)

(52) U.S. Cl.
CPC ............. *B60R 16/03* (2013.01); *B60L 11/1824* (2013.01); *B60L 15/2045* (2013.01); *G06Q 10/06* (2013.01); *G06Q 30/018* (2013.01); *G06Q 30/02* (2013.01); *G06Q 50/06* (2013.01); *B60L 2260/54* (2013.01); *Y02T 10/645* (2013.01); *Y02T 10/7005* (2013.01); *Y02T 10/7072* (2013.01); *Y02T 10/72* (2013.01); *Y02T 10/7283* (2013.01); *Y02T 90/12* (2013.01); *Y02T 90/121* (2013.01); *Y02T 90/14* (2013.01); *Y02T 90/16* (2013.01);
(Continued)

(58) Field of Classification Search
None
See application file for complete search history.

(56) References Cited

U.S. PATENT DOCUMENTS

| 4,180,770 | A | 12/1979 | Eby |
| 7,218,078 | B2 | 5/2007 | Gagnon et al. |
| 8,116,915 | B2 * | 2/2012 | Kempton ...................... 700/291 |
| 8,417,403 | B2 * | 4/2013 | Iida et al. ........................ 701/22 |
| 2007/0029969 | A1 | 2/2007 | Wang et al. |
| 2008/0021628 | A1 * | 1/2008 | Tryon ............................. 701/99 |

FOREIGN PATENT DOCUMENTS

| CN | 1536829 A | 10/2004 |
| CN | 1625014 A | 6/2005 |

(Continued)

*Primary Examiner* — Ryan Jarrett
(74) *Attorney, Agent, or Firm* — VKM Law Group

(57) ABSTRACT

A method and system for identifying at a remote location provide at least one condition associated with an energy system (102) and control the energy system (102) The energy system (102) includes an energy storage system (ESS) (104) capable of storing electric energy, an energy consumption system (ECS) (106) capable of consuming electric energy from the ESS (104) and an energy management system (EMS) (108) capable of interacting with the ESS (104) and the ECS (106) A parameter associated with the ESS (104) is measured, and the measured parameter is compared with reference data to determine the deviation of the measured parameter from the reference data, and the deviation indicates the condition of the energy system (102) The deviation is determined by the EMS (108) or at the remote location, and the deviation is sent to the remote location while the deviation is determined by the EMS (108).

16 Claims, 19 Drawing Sheets

(51) Int. Cl.
  *B60L 11/18*  (2006.01)
  *B60L 15/20*  (2006.01)
  *G06Q 10/06*  (2012.01)
  *G06Q 30/00*  (2012.01)
  *G06Q 30/02*  (2012.01)
  *G06Q 50/06*  (2012.01)
(52) U.S. Cl.
  CPC ................ *Y02T 90/169* (2013.01); *Y04S 30/14* (2013.01); *Y10T 307/406* (2015.04)

(56) References Cited

FOREIGN PATENT DOCUMENTS

| | | |
|---|---|---|
| CN | 201112532 Y | 9/2008 |
| CN | 101312293 A | 11/2008 |
| JP | 2006047130 A | 2/2006 |
| WO | WO 2009020217 A1 * | 2/2009 |

* cited by examiner

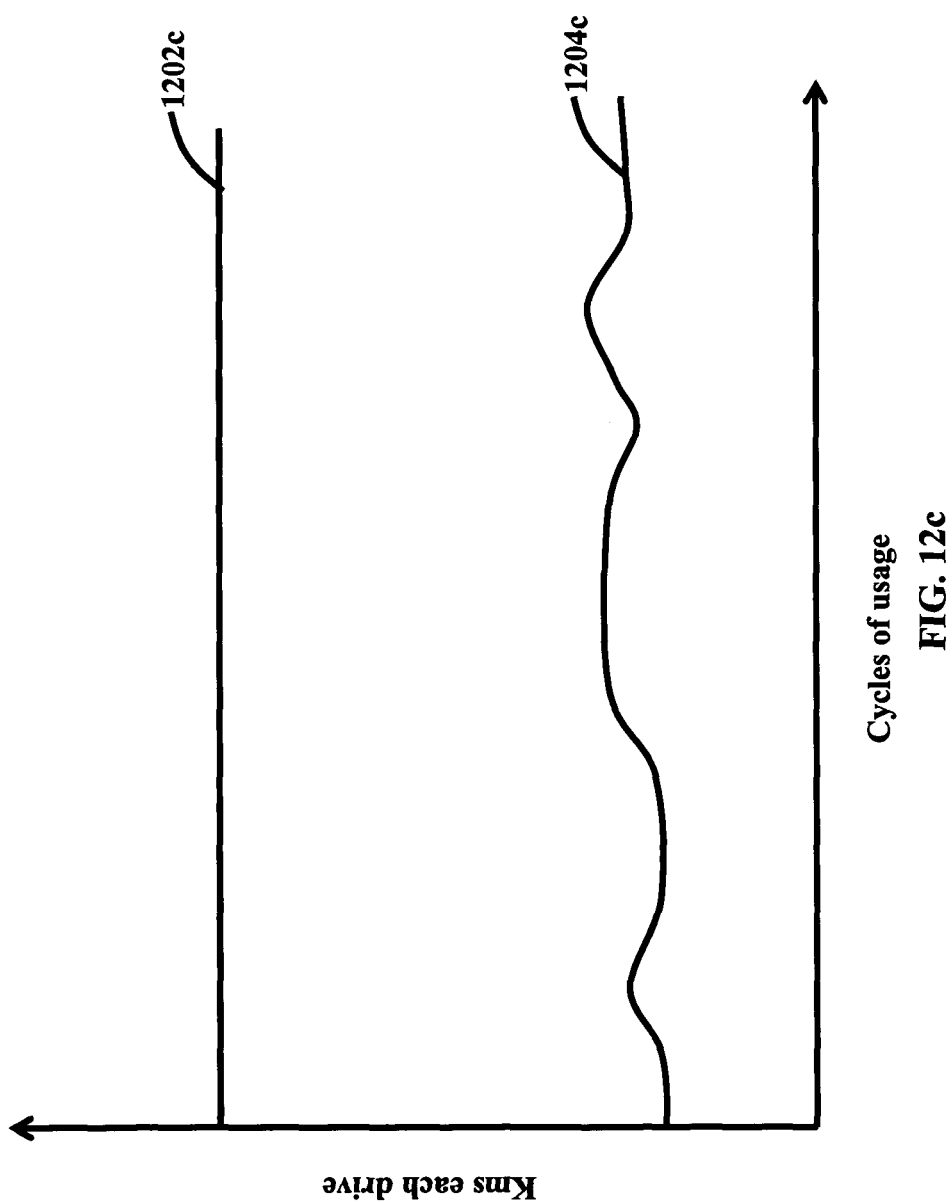

SYSTEM AND METHOD FOR MONITORING AND CONTROLLING ENERGY SYSTEM

FIELD

Embodiments generally relate to energy systems which are at least partially powered by electricity, and more particularly but not exclusively, to remote monitoring of energy systems and adapting control in energy systems.

BACKGROUND

Examples of energy systems which are at least partially powered by electricity include, but are not limited to, electric vehicles, hybrid electric vehicles and uninterrupted power supply systems. Such energy systems generally include energy storage system (ESS), energy consumption system (ECS) and energy management system (EMS). The ESS is configured to store electric energy that may be consumed by one or more sub-systems of the ECS. Further, the EMS is generally configured to communicate with the ESS and the ECS to manage both, based on the instructions provided in the EMS. The EMS, in addition to being configured to manage both ESS and ECS, is also configured to store data related to various parameters relating to the ESS and ECS that can be used for trouble shooting.

Generally, to trouble shoot the energy system, either the system is taken to a service station or service personnel arrive at the location of the system. Subsequently, data stored in the EMS is retrieved for analysis. The data related to various parameters relating to the ESS and ECS are analyzed to identify the problem associated with the system. The above discussed approach of trouble shooting has certain disadvantages which have to be overcome.

Some of the disadvantages of the above discussed approach of trouble shooting include, consumption of time in either taking the system to a service station or arrival of service personnel at the location of the system. Further, prediction of problems that the system may encounter may not be possible. Additionally, the analysis of data to identify the problem may be time consuming.

Further, as aforementioned, conventionally, the EMS is provided with instructions to manage ESS and ECS. The instructions are designed to enable the EMS to manage ESS and ECS to derive optimum performance at certain operating conditions. The operating conditions corresponding to which the instructions are designed may be based on operating conditions in which the energy system is generally used. However, it may be noted that energy system may not always be used under the operating conditions for which the instructions were initially designed. In such situations, the ESS and the ECS may not deliver optimum performance. Hence, a technique for enabling ESS and ECS to deliver enhanced performance under various operating conditions is desired.

STATEMENT OF INVENTION

Accordingly, an embodiment provides a method for identifying at a remote location, at least one condition associated with an energy system. The energy system comprises an energy storage system capable of storing electric energy, an energy consumption system capable of consuming electric energy at least partially from the energy storage system, and an energy management system capable of interacting with at least one of the energy storage system and the energy consumption system. The method includes, measuring at least one parameter associated with the energy storage system, wherein the parameter is related to the condition. Thereafter, comparing the measurement with reference data corresponding to the parameter, and determining deviation of the measured parameter from the reference data, based on the comparison. The deviation indicates the condition of the energy system. The comparison of the measured parameter with the reference data and determining the deviation of the measured parameter from the reference data, are performed by the energy management system or at the remote location. The deviation determined is sent to the remote location if comparing the value with the reference data and determining the deviation of the collected parameter from the reference data, are performed by the energy management system.

There is also provided a system for identifying at a remote location, at least one condition associated with an energy system. The energy system comprises an energy storage system capable of storing electric energy and an energy consumption system capable of consuming electric energy at least partially from the energy storage system. The system further comprises an energy management system configured to interact with at least one of the energy storage system and the energy consumption system. The energy management system comprises a memory device configured for storing reference data, an input and output device configured for collecting measurement of at least one parameter associated with the energy storage system, wherein the parameter is related to the condition, a processor configured for comparing the measurement with the reference data corresponding to the parameter and determining deviation of the measured parameter from the reference data, based on the comparison, wherein the deviation indicates the condition of the system, and a signal transmitting and receiving device configured for transmitting the determined deviation indicating the condition of the energy system to a data processing system located at the remote location.

There is also provided a system for identifying at a remote location, at least one condition associated with an energy system. The energy system comprises an energy storage system capable of storing electric energy and an energy consumption system capable of consuming electric energy at least partially from the energy storage system. The system further comprises an energy management system and a data processing system. The energy management system is configured to, interact with at least one of the energy storage system and the energy consumption system; collect measurement of at least one parameter associated with the energy storage system, wherein the parameter is related to the condition and transmit the collected measurement to the remote location. The data processing system located at the remote location is configured to receive the collected measurement that is transmitted to the remote location, compare the measurement with reference data corresponding to the parameter; and determine deviation of the measured parameter from the reference data based on the comparison, wherein the deviation indicates the condition of the system.

There is also provided a method for adapting control in an energy system which is at least partially powered by electricity. The energy system includes, an energy storage system capable of storing electric energy, an energy consumption system capable of consuming, at least partially, the electric energy stored in the energy storage system, and energy management system comprising instructions for managing the energy storage system and energy consumption system. The method comprises gathering data relating to at least one of the energy storage system and the energy consumption system. The gathered data is used to develop one or more patterns. Further, based on the pattern, it is determined whether modification of the instructions in the energy management system is required. If modification of the instructions in the energy management system is required, then the instructions in the energy management system are modified.

There is also provided a system for adapting control in an energy system which is at least partially powered by electricity. The energy system includes, an energy storage system capable of storing electric energy and an energy consumption system capable of consuming, at least partially, the electric energy stored in the energy storage system. The system comprises an energy management system and data processing system. The energy management system and data processing system are configured to gather data relating to at least one of the energy storage system and the energy consumption system. Further, they are configured to develop pattern from the gathered data and determine whether modification of the instructions in the energy management system is required based on the pattern. Additionally, they are configured to modify instructions in the energy management system if modification of the instructions in the energy management system is required.

These and other aspects of the embodiments disclosed herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments disclosed herein without departing from the spirit thereof, and the embodiments disclosed herein include all such modifications.

BRIEF DESCRIPTION OF FIGURES

Embodiments illustrated in the accompanying drawings, throughout which like reference letters indicate corresponding parts in the various figures. The embodiments disclosed herein will be better understood from the following description with reference to the drawings, in which:

FIG. 12*c* illustrates vehicle usage pattern, in accordance with an embodiment;

DETAILED DESCRIPTION

Figure 1:
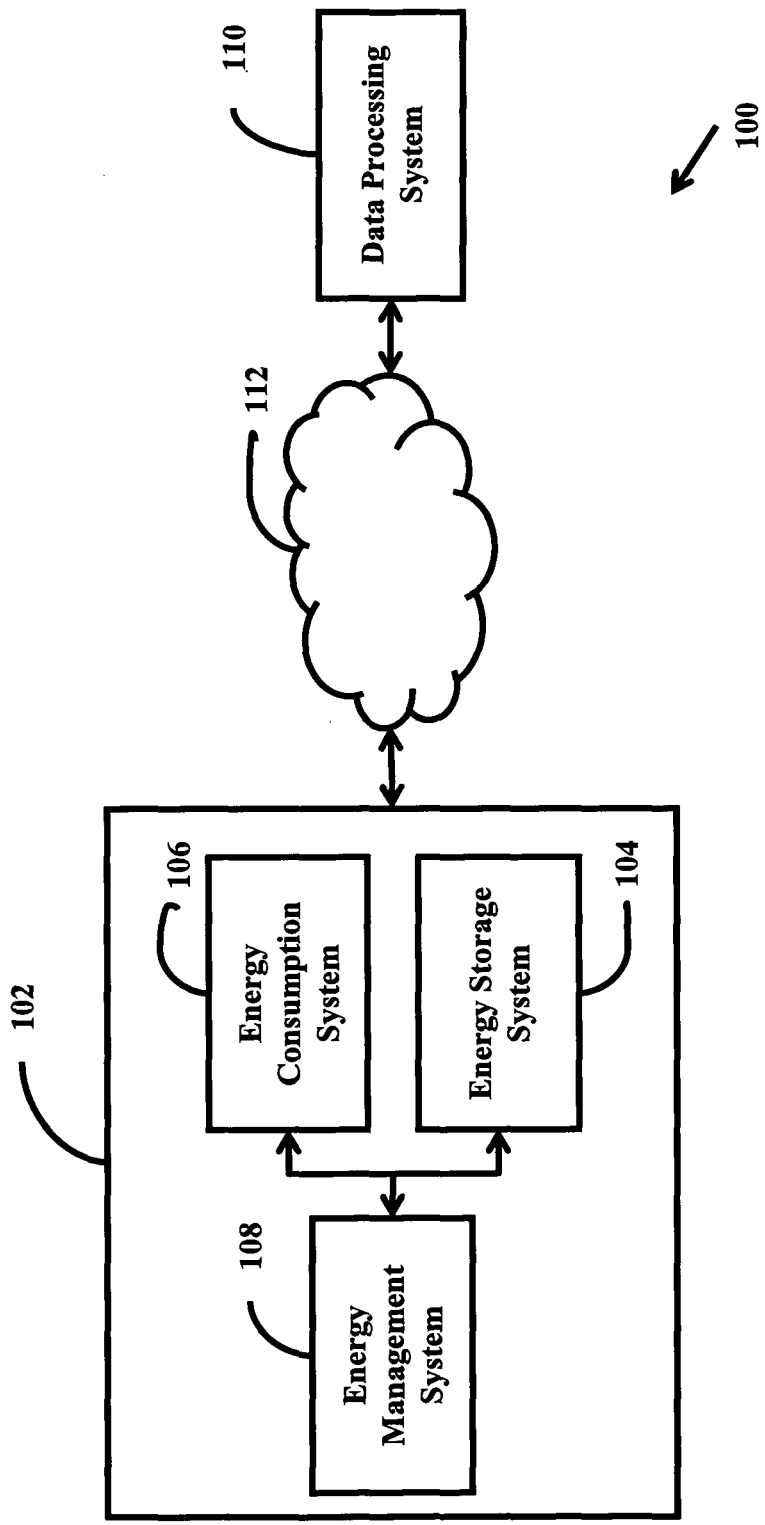
FIG. 1 a block diagram illustrating a system 100 for identifying at a remote location, at least one condition associated with an energy system 102, or adapting control in the energy system 102, in accordance with an embodiment herein.

The embodiments disclosed herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments disclosed herein. The examples used herein are intended merely to facilitate an understanding of ways in which the embodiments disclosed herein may be practiced and to further enable those of skill in the art to practice the embodiments disclosed herein. Accordingly, the examples should not be construed as limiting the scope of the embodiments disclosed herein.

The embodiments disclosed herein enable identifying at a remote location, at least one condition associated with an energy system. Further, the embodiments disclosed herein enable adapting control in the energy system. Referring now to the drawings, and more particularly to FIGS. 1 through 16, where similar reference characters denote corresponding features consistently throughout the figures, there are shown preferred embodiments.

System Description

FIG. 1 a block diagram illustrating a system 100 for identifying at a remote location, at least one condition associated with an energy system 102 and adapting control to the energy system 102, in accordance with an embodiment herein. The system 100 includes an energy system 102 and a data processing system 110 (DPS). Energy system is a system which is at least partially powered by electric energy. Examples of energy system 102, include but are not limited to, electric vehicles, hybrid electric vehicles, and uninterrupted power supply systems. The energy system 102 is wirelessly connected to the DPS 110 which is located at a location which is remote to the location of the energy system 102. The energy system 102 is connected to the DPS 110 through telecommunication network 112.

Data Processing System

The energy system 102 can be configured to transmit data to remote locations and receive data from remote locations. In some embodiments, the energy system 102 communicates with one or more data processing systems 110 (DPS), which can be located at any location, including one or more remote locations. The DPS 110 can include one or more memory devices connected to one or more processing units. The one or more processing units can include, for example, a general-purpose microprocessor, an application-specific integrated circuit, a field-programmable gate array, another device capable of manipulating data, or a combination of devices. In certain embodiments, at least some of the one or more memory devices are integrated with at least one of the processing units. In an embodiment, a DPS is a dedicated computer capable of wirelessly communicating over a telecommunication network. In an embodiment, the DPS 110 is located at a remote location with respect to the energy system 102. In another embodiment, the DPS 110 is located in vicinity of the energy system 102. In other embodiments, the DPS 110 may be a discrete set of components that perform the functions of a DPS 110 as described herein.

Energy System

In energy system 102 includes energy storage system (ESS) 104, energy consumption system (ECS) 106, and energy management system (EMS) 108. The ESS 104 could be a battery pack capable of storing electricity. The ESS 104 may comprise one or more of a combination of Lead-acid battery, Gel battery, Lithium ion battery, Lithium ion polymer battery, NaS battery, Nickel-iron battery, Nickel metal hydride battery, Nickel-cadmium battery, and capacitors among others. The electric energy stored in the ESS 104 is at least partially consumed by one or more sub-systems of the ECS 106.

Figure 2:
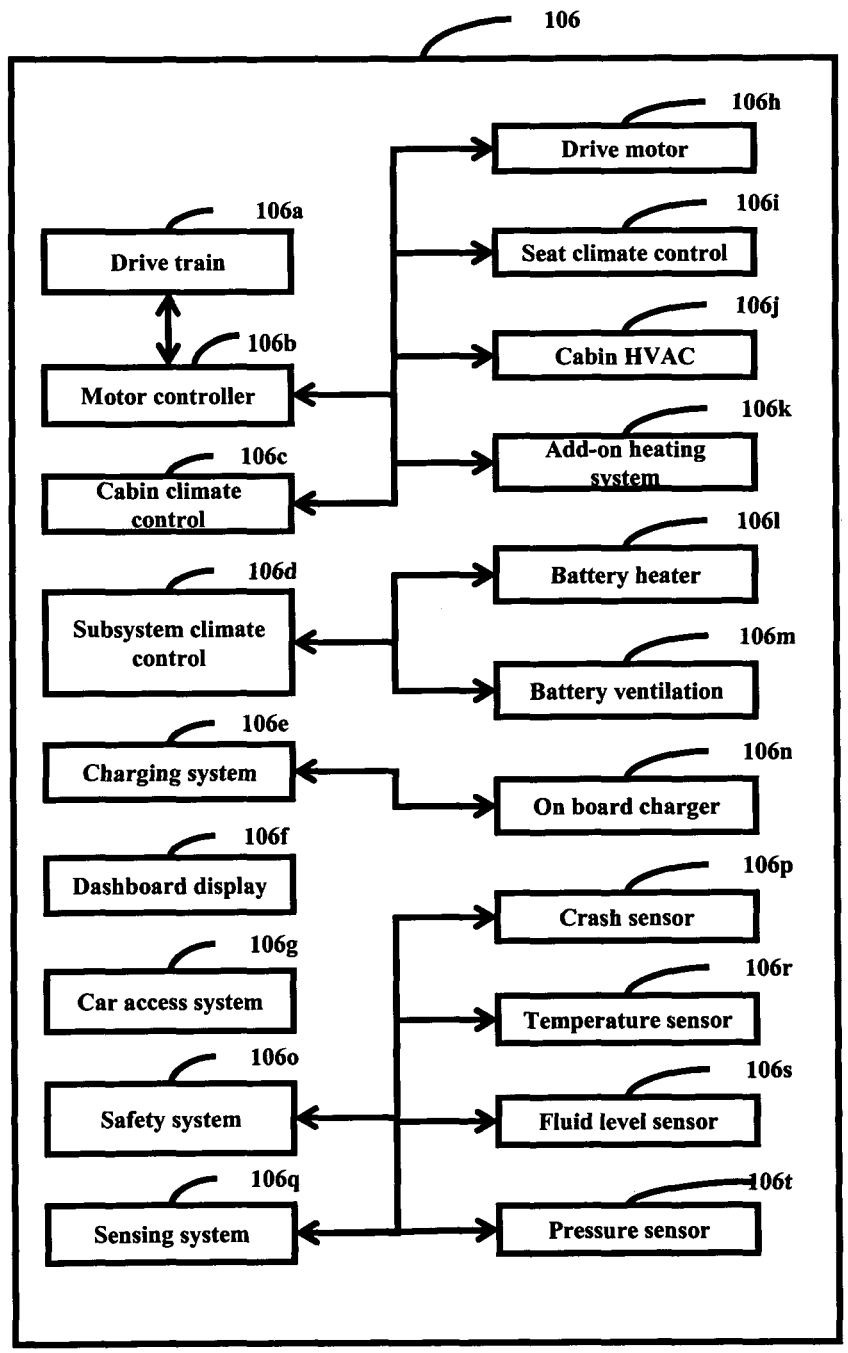
FIG. 2 is a block diagram illustrating sub-systems of ECS 106, in accordance with an embodiment.

ECS 106 may include one or more sub-systems. FIG. 2 is a block diagram illustrating sub-systems of ECS 106, in accordance with an embodiment. The ECS 106 includes sub-systems such as, drive train 106a, motor controller 106b, cabin climate control 106c, subsystem climate control 106d, charging system 106e, dashboard display 106f, car access system 106g, drive motor 106h, seat climate control 106i, cabin HVAC 106j, add-on heating system 106k, battery heater 106l, battery ventilation 106m, on board charger 106n, safety system 106o, crash sensor 106p, sensing system 106q, temperature sensor 106r, fluid level sensor 106s, and pressure sensor 106t, among others. The one or more subsystems of the ECS 106 at least partially consume electric energy stored in the ESS 104. The distribution of the electric energy stored in the ESS 104 to the sub-systems of the ECS 106 is at least partially managed by the EMS 108.

Figure 3:
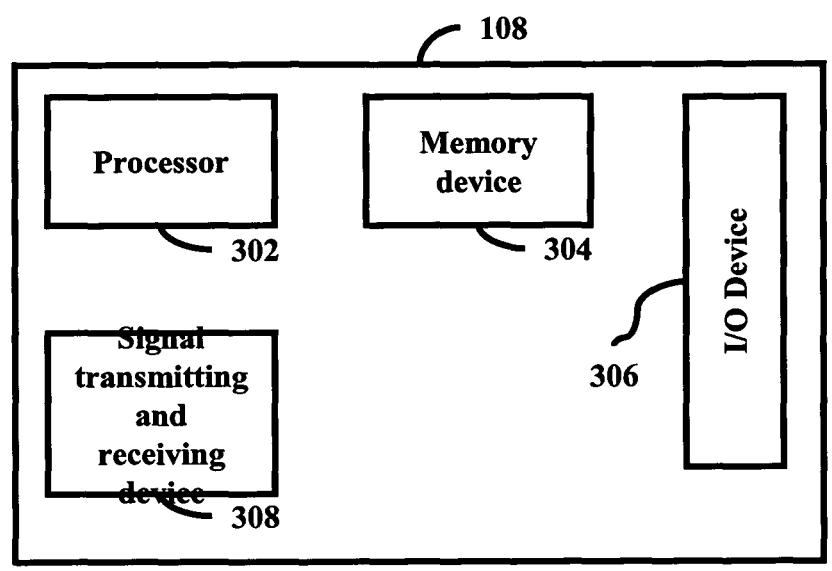
FIG. 3 is a block diagram illustrating an EMS 108, in accordance with an embodiment.
Figure 4:
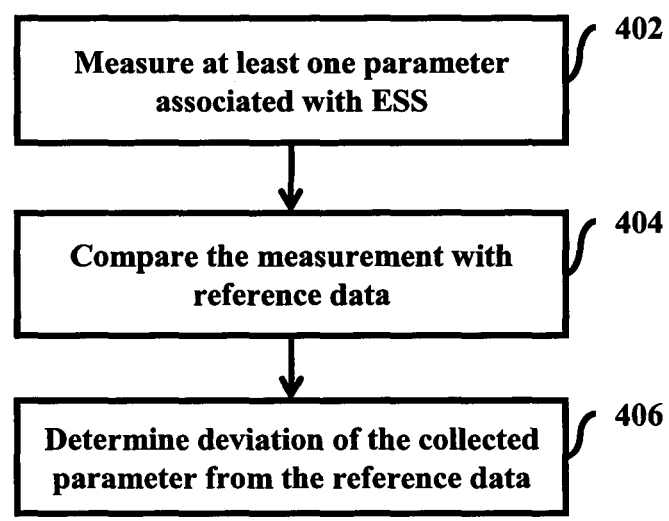
FIG. 4 is a flowchart illustrating a method for identifying at a remote location, at least one condition associated with an energy system 102, in accordance with an embodiment herein.

FIG. 3 is a block diagram illustrating an EMS 108, in accordance with an embodiment. EMS 108 comprises a processor 302, memory device 304, input and output (I/O) device 306 and signal transmitting and receiving device 308. Processor 302 is capable of receiving and processing data obtained from, I/O device 306, signal transmitting and receiving device 308, and memory device 304. Further, the processor 302 is capable of sending data to memory device 304 for storage. Additionally, the processor 302 is capable of sending commands to I/O device 306 which in turn are communicated to systems and sub-systems associated with the I/O device 306. Further, the processor 302 is capable of sending data to signal transmitting and receiving device 308 for transmitting the data to DPS 110 and the like. In an embodiment, processor 302 is made of electronic circuits comprising commercially available general purpose microcontroller chips. The memory device 304 may comprise a combination of volatile and non volatile memory chips that can store information in digital form. The I/O device 306 comprises sets of output lines each of which is individually connected to the processor 302. These output lines may be a combination of analog inputs, analog outputs, digital inputs, digital outputs, pulse/frequency outputs and data lines. The data lines are connected to the external world through signal transmitting and receiving device 308.

Remote Monitoring

The system 100 is capable of identifying at a remote location, at least one condition associated with the energy system 102. The energy system 102 comprises ESS 104 which is capable of storing electric energy, ECS 106 which is capable of at least partially consuming electric energy from the ESS 104, and EMS 108 which is capable of interacting with at least one of the ESS 104 and the ECS 106. A method for identifying at a remote location, at least one condition associated with the energy system 102 is illustrated by a flow chart in FIG. 4, in accordance with an embodiment. The method includes, at step 402, measuring at least one parameter associated with the ESS 104, wherein the parameter is related to the condition. Thereafter, at step 404, the measurement is compared with reference data corresponding to the parameter and, at step 406, deviation of the collected parameter from the reference data is determined based on the comparison. The deviation indicates the condition of the system 100. In an embodiment, comparing the value with the reference data and determining the deviation of the collected parameter from the reference data, are performed, by the EMS 108 and, the deviation thus determined is sent to the remote location. In another embodiment, comparing the value with the reference data and determining the deviation of the collected parameter from the reference data, are performed at the remote location.

The various actions in the above method may be performed in the order presented, in a different order or simultaneously.

Measurement of one or more parameters from at least one of ESS 104 and ECS 106, depends on the condition which needs to be determined.

Measurement of Parameter

Some of the parameters that are measured by obtaining readings from ESS 104 or ECS 106, and some of the parameters that are measured by computation using the obtained readings are provided in Table 1. The data can be collected in substantially real time, or the date can be collected at intervals of time.

| Parameter relating to | Measured Parameter | Remarks |
|---|---|---|
| System (100) | Time | Real time in date/hrs/min/sec |
| ESS (104) | Cycle Number | These are periodic |
| | Individual cell voltages | measurements being done in a cycle manner. For eg: All |
| | Individual cell temperatures | such readings are being taken every 0.5 secs and being |
| | Water level | transmitted |
| | Current | |
| Ambient | Temperature | |
| ECS - Motor | Individual currents | |
| | Individual voltages | |
| | Temperature | |
| ECS - Motor controller | Temperature | |
| | Input voltage | |
| | Output voltages | |
| | Input current | |
| | Output current | |
| | Throttle position/value | |
| | Brake position/value | |
| | Motor Speed | |
| ECS - HVAC and other subsystems | Status ON/OFF | |
| | Cabin Temperature | |
| | Voltage | |
| | Current | |
| ESS | ESS power (kW) | Calculated using ESS voltage and current |
| | ESS deviation | Calculated using voltages of individual cells of the ESS |
| | ESS energy (kWH) | Calculated using ESS power and time |

-continued

| Parameter relating to | Measured Parameter | Remarks |
|---|---|---|
| | ESS impedance | Calculated using ESS voltage and current |
| | Temperature rise | Calculated using ESS temperature and time |
| | ESS voltage | Calculated using ESS individual cell voltages |
| | State of Charge | Calculated using ESS voltage, current, power, time. |
| | Ampere Hour | Calculated using ESS current and time |
| | Regen AH | Calculated using ESS current and time |
| | Time to charge | Calculated using ESS voltage, current, State of charge, temperature |
| | Speed | Calculated using Motor speed, gear ratio, tyre diameter |
| Energy system | Distance (km) | Vehicle Speed, Time |
| | Drive consumption Wh/km | Energy, speed |
| | HVAC Power | Calculated using ESS voltage, HVAC current |
| | Torque | Calculated using ESS Motor speed, power |
| ECS - Motor | Power | Calculated using ESS Motor voltage and current |

Parameters other than the ones mentioned above may be measured based on what the condition that needs to be identified relates to.

Reference Data

The one or more parameters that are measured are compared with reference data corresponding to the parameter.

The reference data used for comparing can vary based on at least one of, age of the ESS 104, number of charge and discharge cycles the ESS 104 has experienced, ambient temperature of the system 100, terrain in which the system 100 is used, among others.

Figure 5:
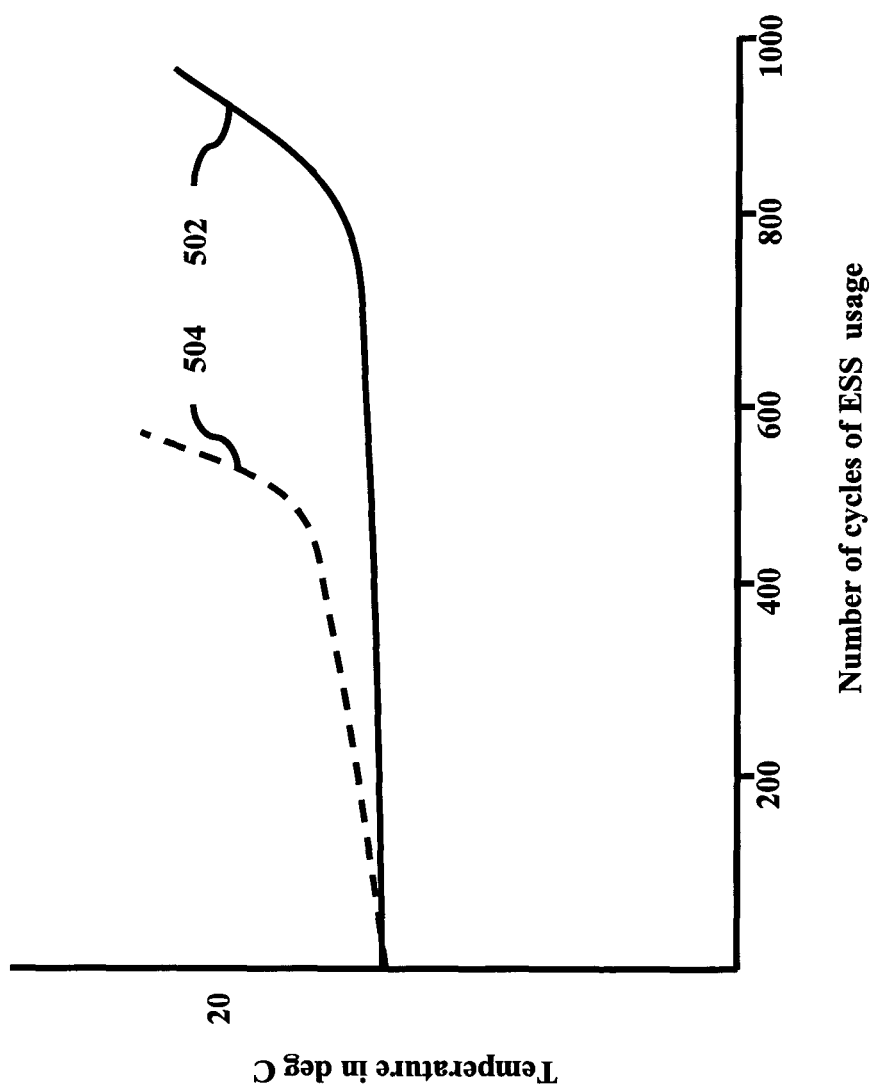
FIG. 5 is a graph illustrating reference of temperature, in accordance with an embodiment.

FIG. 5 is a graph illustrating reference temperature, in accordance with an embodiment. In the graph, line 502 represents reference temperatures at various time-points during the life of the ESS 104. As can be seen in the graph, the temperature of the ESS 104 during usage varies with number of cycles of usage of the ESS 104. The reference data, which is line 502 in this graph can be used for comparing with data corresponding to the ESS 104. In the graph, line 504 represents data corresponding to the temperature of the ESS 104 which has been collected at various stages of usage.

Figure 6:
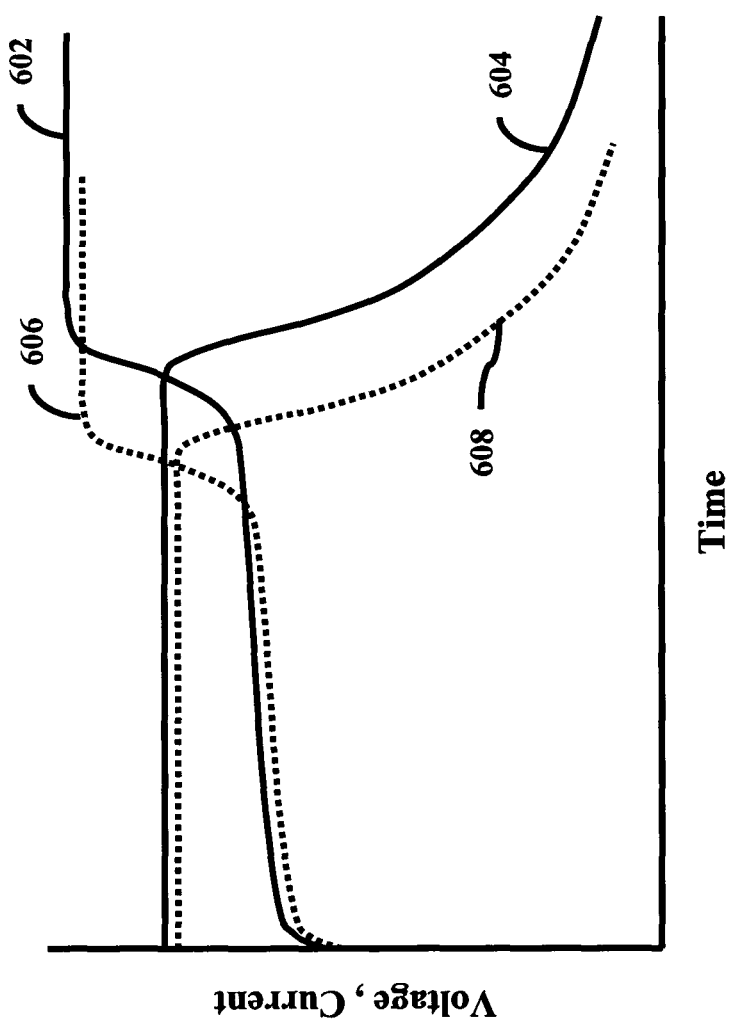
FIG. 6 is a graph illustrating reference of charging pattern of ESS, in accordance with an embodiment.

FIG. 6 is a graph illustrating reference of charging pattern of ESS 104, in accordance with an embodiment. In the graph, lines 602 and 604 represent reference of change in voltage and current, respectively, during charging of the ESS 104 during the initial stages of its usage. Further, lines 606 and 608 represent reference of change in voltage and current, respectively, during charging of the ESS 104 after 800 cycles of usage. Similarly, reference data corresponding to different stages of usage of the ESS 104 will be available for comparison.

Figure 7:
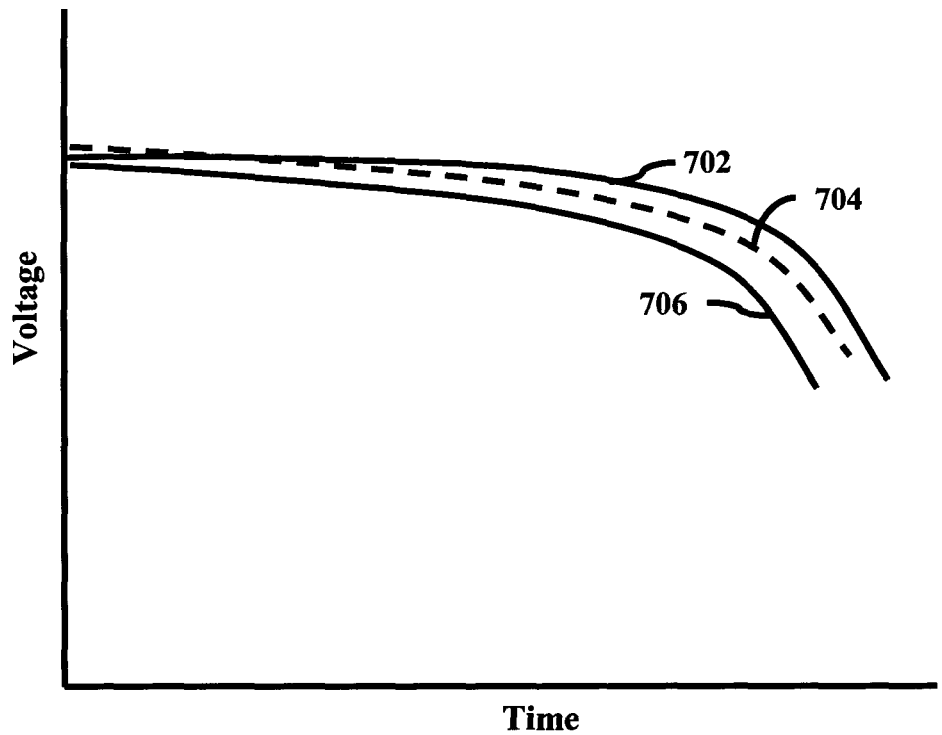
FIG. 7 is a graph illustrating reference of discharge pattern of ESS, in accordance with an embodiment.

FIG. 7 is a graph illustrating reference of discharge pattern of ESS 104, in accordance with an embodiment. In the graph, lines 702 and 706 represent reference data of discharge pattern at constant current, during initial stages of cycles of usage of ESS 104 and after 800 cycles of usage of ESS 104, respectively. Further, line 704 represent actual discharge pattern at constant current of ESS 104 after 1000 cycles of usage. Similarly, reference data of discharge pattern corresponding to different stages of usage of the ESS 104 will be available for comparison.

Figure 8:
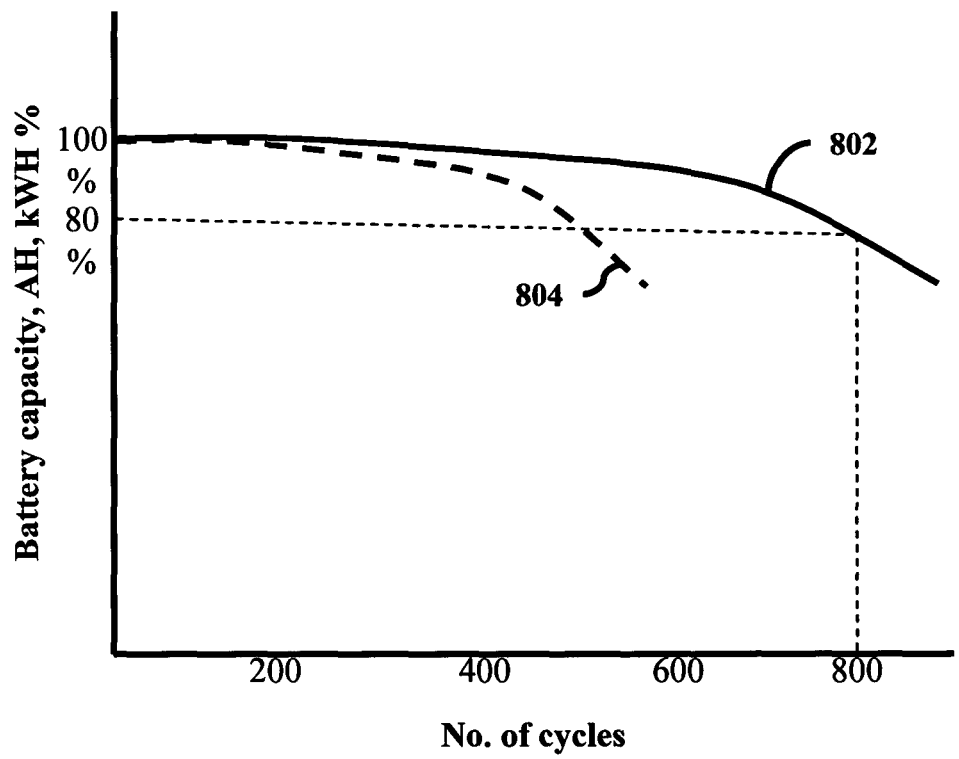
FIG. 8 is a graph illustrating reference of capacity of ESS, in accordance with an embodiment.

FIG. 8 is a graph illustrating reference of capacity of ESS, in accordance with an embodiment. In the graph, line 802 represents reference of change in capacity of the ESS 104 corresponding to the cycles of usage of ESS 104. Further, line 804 represents actual change in capacity of the ESS 104 corresponding to the cycles of usage of ESS 104. The reference line 802 is compared with line 804 to determine if there is any condition associated with the ESS 104, which may be required to be addressed.

Figure 9:
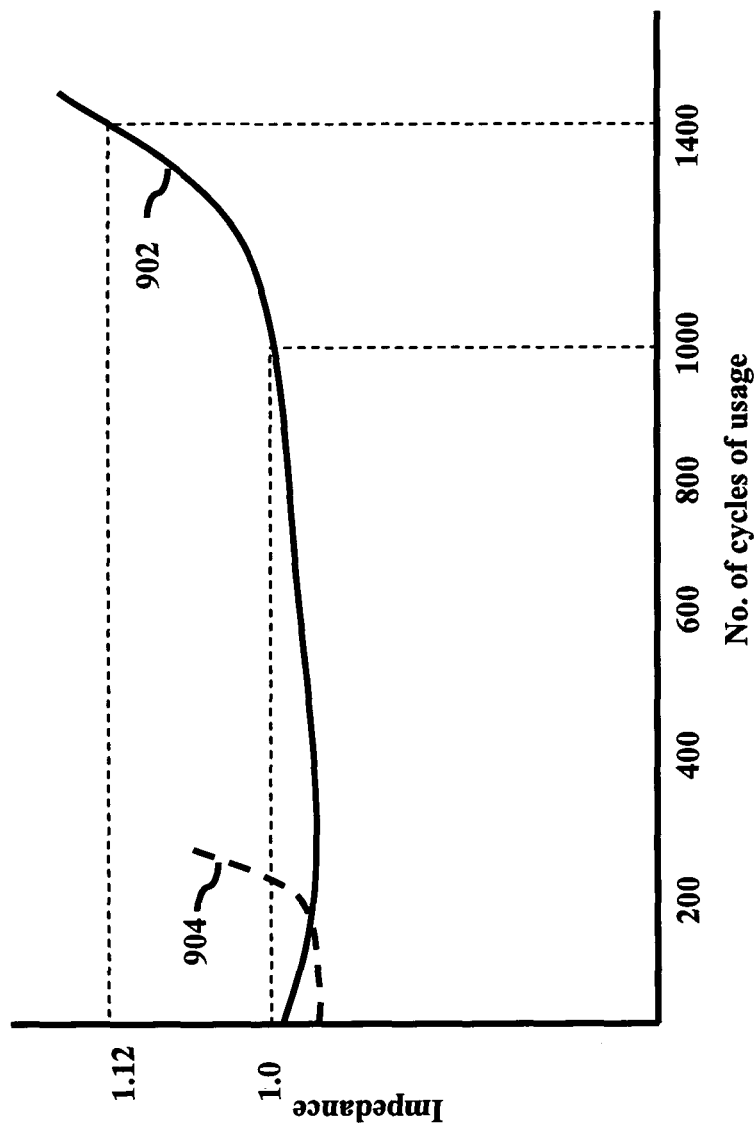
FIG. 9 is a graph illustrating reference of impedance of ESS, in accordance with an embodiment.
Figure 10:
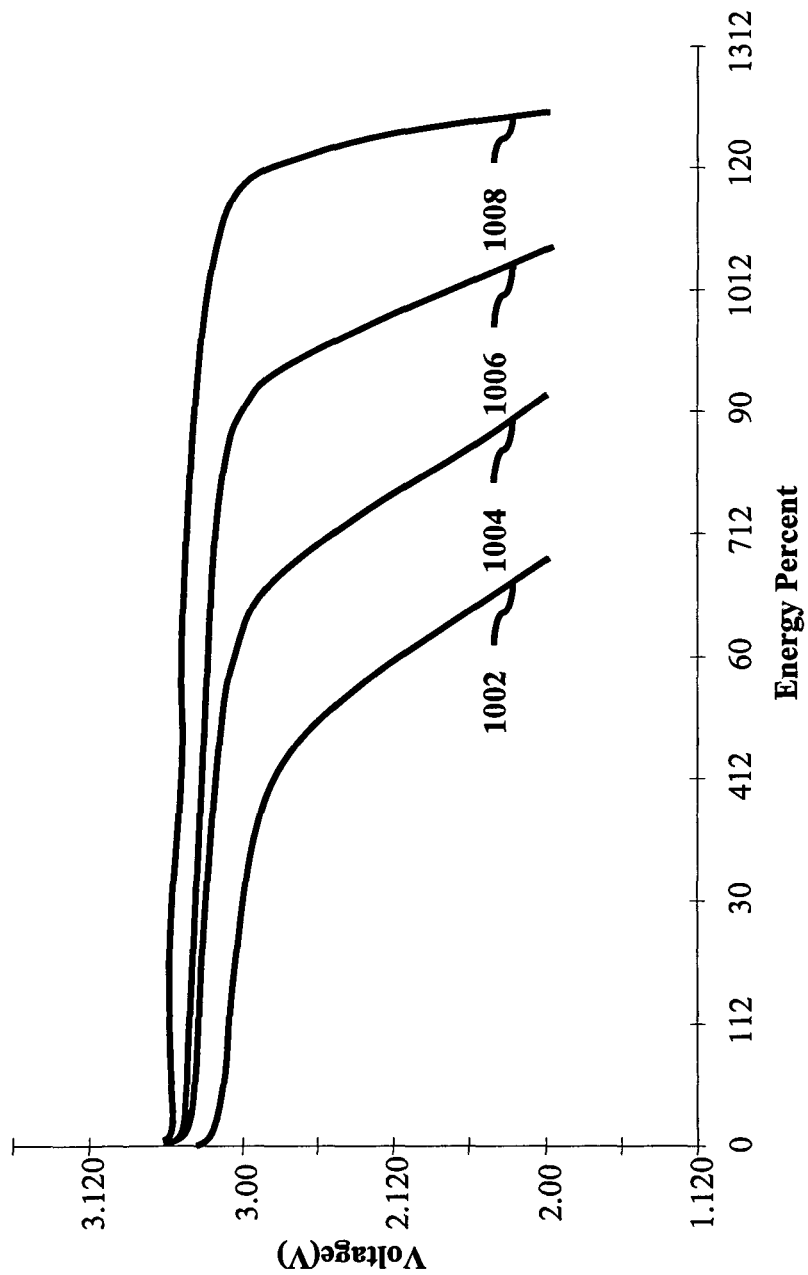
FIG. 10 is a graph illustrating reference of discharge pattern of ESS, in accordance with an embodiment.

FIG. 9 is a graph illustrating reference of impedance of ESS 104, in accordance with an embodiment. In the graph, line 902 represents reference of change in impedance of the ESS 104 corresponding to the cycles of usage of ESS 104. Further, line 904 represents actual change in impedance of the ESS 104 corresponding to the cycles of usage of ESS 104. The reference line 902 is compared with line 904 to determine if there is any condition associated with the ESS 104, which may be required to be addressed. FIG. 10 is a graph illustrating reference of discharge pattern of ESS 104, in accordance with an embodiment. In the graph, lines 1002, 1004, 1006 and 1008 represent reference of discharge pattern of ESS 104, at temperatures 0° C., 10° C., 25° C. and 40° C., respectively. Further, based on the operating temperature of the ESS 104, corresponding reference data may be used for comparison. Similarly, reference data corresponding to different temperatures of usage of the ESS 104 will be available for comparison.

The reference data is used for comparing with actual data collected from the energy system 102, to identify condition of the energy system 102.

Comparing Measured Parameter with Reference Data

Conditions associated with the energy system 102 may be determined by comparing the data collected from the energy system 102 with the reference data. For example, condition which may result in low range offered by ESS 104 may be identified by the comparison. The comparison shows the deviation of actual performance of one or more parts of the energy system 102 from the reference data. In an embodiment where the energy system 102 is a vehicle which is at least partially powered by electricity, comparison may highlight the condition associated with the vehicle. In case the driving range (distance that can be driven) offered by the vehicle is lesser than the expected value, the comparison may highlight the condition that is responsible for the low range being offered.

FIG. 5 illustrates a comparison between the actual temperature of the ESS 104 and the reference temperature of the ESS 104 at various stages of cycles of usage. As can be seen in the graph, there is a substantial deviation of the actual temperature from the reference. This may be an indication of a fault associated with the ESS 104 or components responsible for controlling the temperature of the ESS 104. Additionally, this comparison may also enable identification of breakdown of one or more parts of the energy system 102, in the future.

Similarly, FIG. 7 shows comparison between actual discharge pattern 704 and reference discharge pattern 706. In this graph, lines 702 and 706 represent reference data of discharge pattern at constant current, during initial stages of cycles of usage of ESS 104 and after 800 cycles of usage of ESS 104, respectively. Further, line 704 represent actual discharge pattern at constant current of ESS 104 after 1000 cycles of usage. As it can be seen in the graph, the ESS 104 is performing better than what is expected of it at the current stage of usage. This is an indication that the ESS 104 is in good health.

Further, FIG. 8 illustrates a comparison between the capacity of the ESS 104 and the reference capacity of the ESS 104 at various stages of cycles of usage. As can be seen in the graph, there is a substantial deviation of the actual capacity from the reference. This may be an indication of a fault associated with the ESS 104. In an embodiment, this comparison indicates that lower range offered by the ESS 104 may be because of the lower capacity of charge held by the ESS 104. Additionally, this comparison may also enable identification of breakdown of one or more parts of the energy system 102, in the future. Similarly, FIG. 9 illustrates a comparison between the impedance of the ESS 104 and the reference impedance of the ESS 104 at various stages of cycles of usage. As can be seen in the graph, there is a substantial deviation of the actual impedance from the reference. This may be an indication of a fault associated with the ESS 104.

In an embodiment, the reference data that is used for comparison may be derived from data collected from a fleet of energy systems 102. For example, if the energy system 102 is a vehicle which is at least partially powered by electricity, than reference data is derived from data collected from a fleet of electric vehicles. Data corresponding to charge profile, discharge profile, temperature profile, and capacity profile, among others, are collected from a fleet of vehicles. The collected data is used to derive charge pattern, discharge pattern, temperature pattern, and capacity pattern, among others. Further, it may be noted that a fleet of vehicles which may have undergone approximately equal number of usage cycles are used to derive reference data corresponding to that approximate number of usage cycles. Further, a fleet of vehicles which are exposed to similar operating conditions are used to derive reference data which can be used for comparing with data collected from vehicles operating conditions similar to the above mentioned conditions.

Method for Adapting Control in an Energy System

Figure 11:
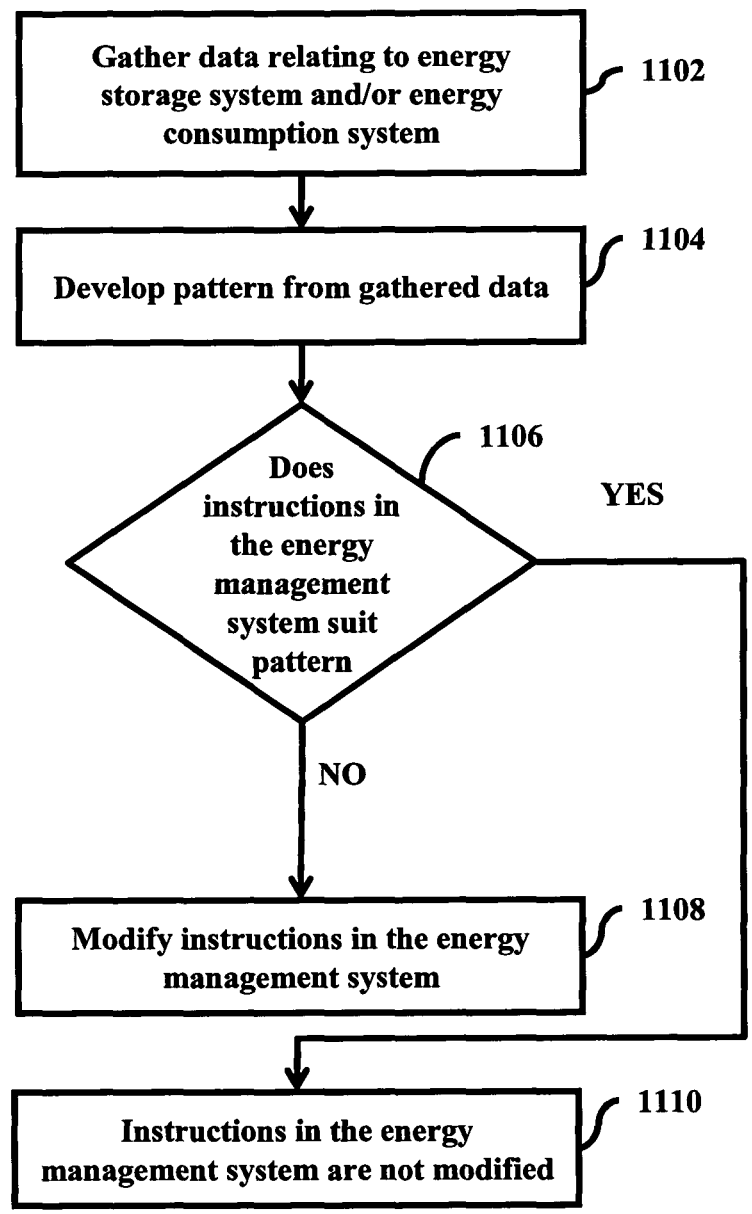
FIG. 11 is a flow chart illustrating a method for adapting control in a energy system, in accordance with an embodiment.

FIG. 11 is a flow chart illustrating a method for adapting control in an energy system 102, in accordance with an embodiment. The method includes, at step 1102, gathering data relating to at least one of the ESS 104 and the ECS 106. The data is gathered by the EMS 108. The data that is gathered by the EMS 108 is used to develop one or more patterns, at step 1104. Further, at step 1106, instructions present in the EMS 108 to manage ESS 104 and ECS 106 are checked to determine whether modification of the instructions is required based on the patterns. Subsequently, at step 1108, the instructions are modified, if at step 1106 it is determined that the instructions have to be modified.

The various actions in above method may be performed in the order presented, in a different order or simultaneously. Further, in some embodiments, some actions listed in FIG. 11 may be omitted.

Gathering Data from ESS and ECS

As mentioned above, adapting control in the energy system 102 requires gathering of data from at least one of ESS 104 and ECS 104 to develop patterns. In an embodiment, the gathered data is used to compute parameters which can be used to develop patterns.

In an embodiment, the data that is gathered by the EMS 108 is used for computing parameters that can be used for developing patterns.

Table 2 provides an exemplary list of parameters that are computed using the gathered data.

| Parameter | Computed using | Remarks |
|---|---|---|
| Battery power kW | Voltage and current | The calculations can be done with the same periodicity as the measurements. |
| Battery deviation | Individual cell voltages | |
| Battery energy kWH | Battery power and time | |
| Battery impedance | Battery voltage and current | |
| Temperature rise | Temperature and time | |
| Motor Torque | Motor speed, power | |
| Motor power | Motor voltage and current | |
| State of Charge | Battery voltage, current, power, time. | |
| Ampere Hour | Battery current and time | |
| Regen AH | Battery current and time | |
| Energy storage system voltage | Individual cell voltages | |
| Vehicle speed | Motor speed, gear ratio, tyre diameter | |
| Distance km | Vehicle Speed, Time | |
| Drive consumption Wh/km | Energy, speed | |
| HVAC Power | Battery voltage, HVAC current | |
| Time to charge | Battery voltage, Battery current, State of charge, temperature | |

Developing Patterns

The data that is gathered and the parameters that are computed are used to generate patterns that enable adapting control in energy system 102.

In an embodiment, the patterns that are generated are categorized as historical and current. Patterns' that are historical are generated using, data gathered over a relatively long period of time and parameters computed using the data gathered over the relatively long period of time. Whereas, patterns that are current are generated using, data gathered over a relatively short period of time and parameters computed using the data gathered over the relatively short period of time.

Figure 12:
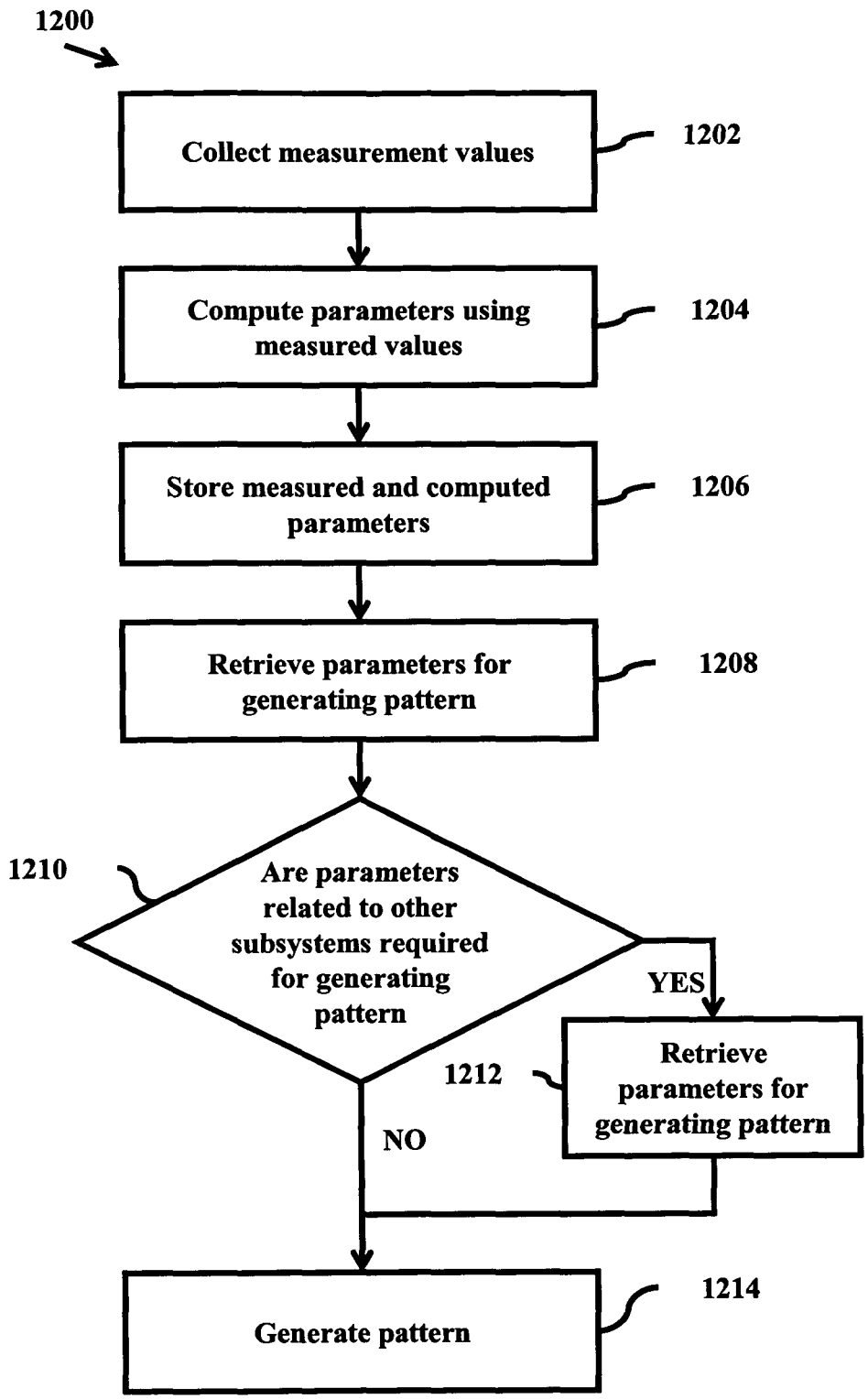
FIG. 12 is a flow chart illustrating a method of developing a pattern, in accordance with an embodiment.

FIG. 12 is a flow chart illustrating a method of developing a pattern, in accordance with an embodiment. At step 1202 measurement values from at least one of the ESS 104 and ECS 106 are collected by EMS 108. The EMS 108 receives the data from I/O device 112. The EMS 108 uses the collected data at step 1202 to compute parameters at step 1204. The parameters are computed by processor 108. Alternatively, the collected data is at least partially sent to DPS 110 where the parameters are determined by the data DPS 110. At step 1206 at least a part of one or more of collected and determined data is stored at the DPS 110. Later, based on the pattern to be generated, the stored data is retrieved at step 1208. Based on requirement, the sample size of the data that is retrieved and the time period in which the retrieved data is collected will vary. Further, at step 1210, it is determined whether data related to any other system other that the ones for which data is retrieved at step 1208 is required. If, data from other systems are required, then the same is retrieved at step 1212. Even at step 1212, based on requirement, the sample size of the data that is retrieved and the time period in which the retrieved data is collected may vary. Subsequently, the retrieved data is correlated to generate the required pattern at step 1214. The various actions in method 1200 may be performed in the order presented, in a different order or simultaneously. Further, in some embodiments, some actions listed in FIG. 12 may be omitted.

Some of the patterns that are developed using data gathered from energy systems 102 are as follows:

Examples of Patterns Generated for Energy Systems Charge Pattern

A charge pattern indicates a pattern in which ESS 104 is being charged over a period of time. As an example, User 1 could be charging ESS 104 up to 100% on 90% of the occasions, and up to 90% on 10% of the occasions. Whereas, User 2 could be charging ESS 104 up to 80% on 40% of the days, and up to 90% on 20% of the days and up to 100% on other days. Alternatively, another user may be repeatedly disturbing ESS 104 equalization charge regime thus not allowing the ESS 104 to complete equalization. The charge pattern calculation for a Battery as an ESS 104 makes use of at least one or more of cycle numbers, state of charge, ampere hours, duration of charge, battery energy and temperature.

Temperature Pattern

ESS 104 temperatures pattern is a plot of the average, maximum and minimum ESS 104 temperatures reached in each charge and drive over a period of the ESS 104 lifetime or a part of the lifetime. Such information allows analysis of the changes in behaviour of ESS 104 with climatic changes, ageing and usage pattern. The pattern also allows analysis of any behavioural anomalies in the ESS 104 themselves or preconditioning systems. The temperature pattern in a typical battery as ESS is calculated using at least one or more of cycle number, duration of charge and discharge, currents drawn and temperatures of batteries, environment and other subsystems.

State of Health Pattern

State of health is a parameter that indicates the ESS 104 capabilities at any given time. The state of health is derived from parameters like capacity, age and impedance. In normal usage, the ESS 104 state of health goes on diminishing with ageing and usage. A pattern of the state of health against cycles of usage gives indications on the ESS 104 ageing process. This information is used for several functions like: indicating driving range for the customer, predicting any imminent failures and also understanding factors that affect the state of health. The state of health pattern in a typical Battery as ESS is generated using at least one or more of the cycle numbers, ampere hours, energy in kwh, temperature and impedance Capacity Pattern ESS 104 capacity is an absolute measure of the useable energy in the ESS 104 at any given cycle. This capacity is expected to follow a certain pattern of initial improvement and later decay depending on the ESS 104 type. A plot of the actual variation of the capacity with cycle life gives important indications of the health of the ESS 104. The capacity pattern in a typical Battery as ESS is generated using at least one or more of cycle numbers, temperatures, amperehours, state of charge and energy in kwh.

Examples of Patterns Generated when Vehicle is the Energy System

Energy Usage Pattern

Energy usage pattern is a map of the way energy is being used from the ESS 104. In a case where the energy system 102 is a vehicle, this pattern would be a map of the way the user is using stored energy during each drive. As an example, User 1 could be using 30-40% of the energy in 90% of the drives and using 90% of the energy in the rest of the drives. User 2 could be using 90-80% of the energy in most of the drives and lower levels of energy in only some of the drives. The energy usage pattern in a typical Electric Vehicle application is generated using at least one or more of cycle numbers, drive distance in kms and energy in kwh.

Drive Pattern

Drive pattern is a map of the way energy is being used. In a case where the energy system 102 is a vehicle, User 1 could be using higher levels of energy per kilometre covered as compared to predetermined values, indicating a harsh drive or rough terrain. User 2 could be covering more kilometers per unit energy consumed, thereby indicating a different drive pattern. Also, patterns from user 1 could indicate larger number of start stops compared to user 2. The drive pattern in a typical Electric Vehicle application is generated using at least one or more of cycle numbers, drive distance in kms, energy in kwh, speed and temperature Vehicle Usage Pattern In a case where the energy system 102 is a vehicle, this pattern would indicate the way the vehicle is being used by the user. For example, User 1 could be an occasional user, using the vehicle only once every week, and User 2 could be a frequent user who uses the vehicle everyday but only drives for a few kilometres everyday. A User 3 could be using the vehicle for long distances every day. The usage patterns help in predicting and analyzing subsystem behaviour to specific the way the vehicle is used. The vehicle usage pattern in a typical Electric Vehicle application would be generated using at least one or more of cycle numbers, date and time, duration of charge, duration of drive, drive distance in kms and speed.

Driving Speed Pattern

In a case where the energy system 102 is a vehicle, the driving speed pattern is another indicator of the way the vehicle is used. These patterns not only help to differentiate between individual users, but also help to understand the patterns in different geographies and across seasons. An example of possible inferences from the speed pattern could be: Average driving speed in London during Sundays is twice the average speed in Bangalore. The driving speed pattern in a typical electric Vehicle application is generated using at least one or more of cycle numbers, duration of drive, speed, distance of drive, date and time and temperature.

Regenerative Energy Pattern

In a case where the energy system 102 is a vehicle, the vehicle may also recover energy into the ESS 104 during braking. The energy returned is a function of several factors like the terrain, the user's braking habits, certain software settings and state of the car's braking system. A pattern of the extent of this energy recovery over cycles of usage gives a fair indication of the user's habits and the health of the braking system. Such a pattern can be used for analysis of the user's drive efficiency and health of the regenerative braking systems. Data from regenerative energy patterns under different climatic and geographical conditions also help in arriving at new ways of optimizing the software settings. The regenerative energy pattern in a typical electric Vehicle application is generated using at least one or more of cycle numbers, distance of drive, battery currents, energy in kwh, date and time and temperature HVAC Usage Pattern The HVAC system is a sub-system of the ECS 106. The energy consumption can be plotted against cycles of usage or against time within a specified period. Analysis of this patterns helps in understanding usage patterns of particular users and also geographical patterns. This information is used to moderate range expectations under different conditions and also trouble shoot systems when required. The HVAC usage pattern in a typical electric vehicle application is generated using at least one or more of cycle numbers, date and time, HVAC power, duration of drive and temperature.

Examples of Patterns Generated when the Energy System is not an Electric Vehicle In an embodiment where energy system is a solar farm feeding energy to a residential commune, similar patterns can be generated and optimized for performance based on the patterns. Energy consumption patterns of individual consumers over the day and over seasons can be generated to estimate demands on peak and average loads. These patterns can further be used to provide feedback to consumers to 'stagger' the peak loads and achieve load balancing. The patterns generated can be used to automatically schedule switching of elevators in apartment blocks, garden sprinklers, swimming pool heating systems and common area lighting.

In light of the foregoing description, it will be clear to a person skilled in the art that the patterns other than the ones discussed above can be generated based on requirement.

Figure 12A:
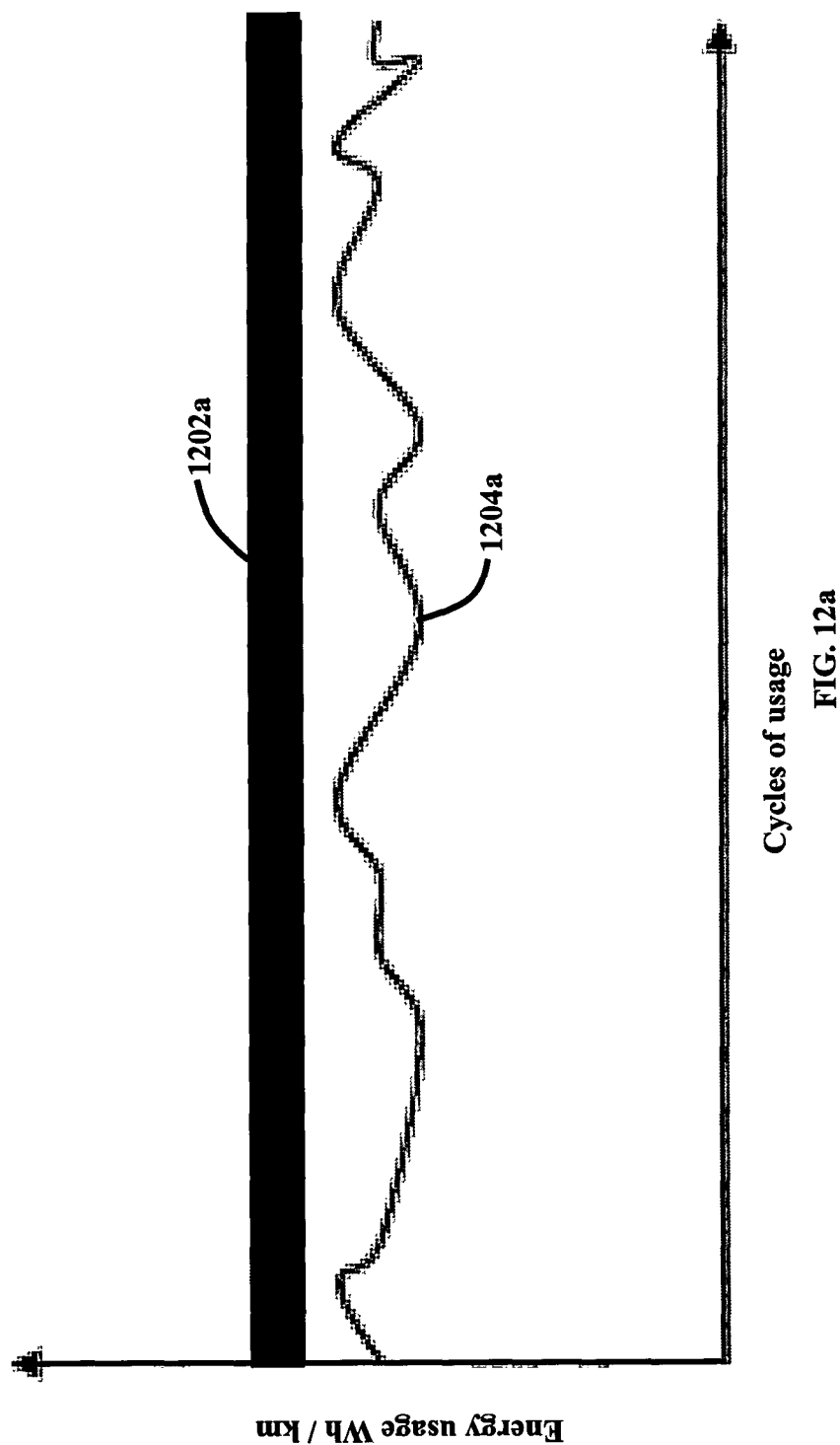
FIG. 12*a* illustrates energy usage pattern from ESS, in accordance with an embodiment.
Figure 12B:
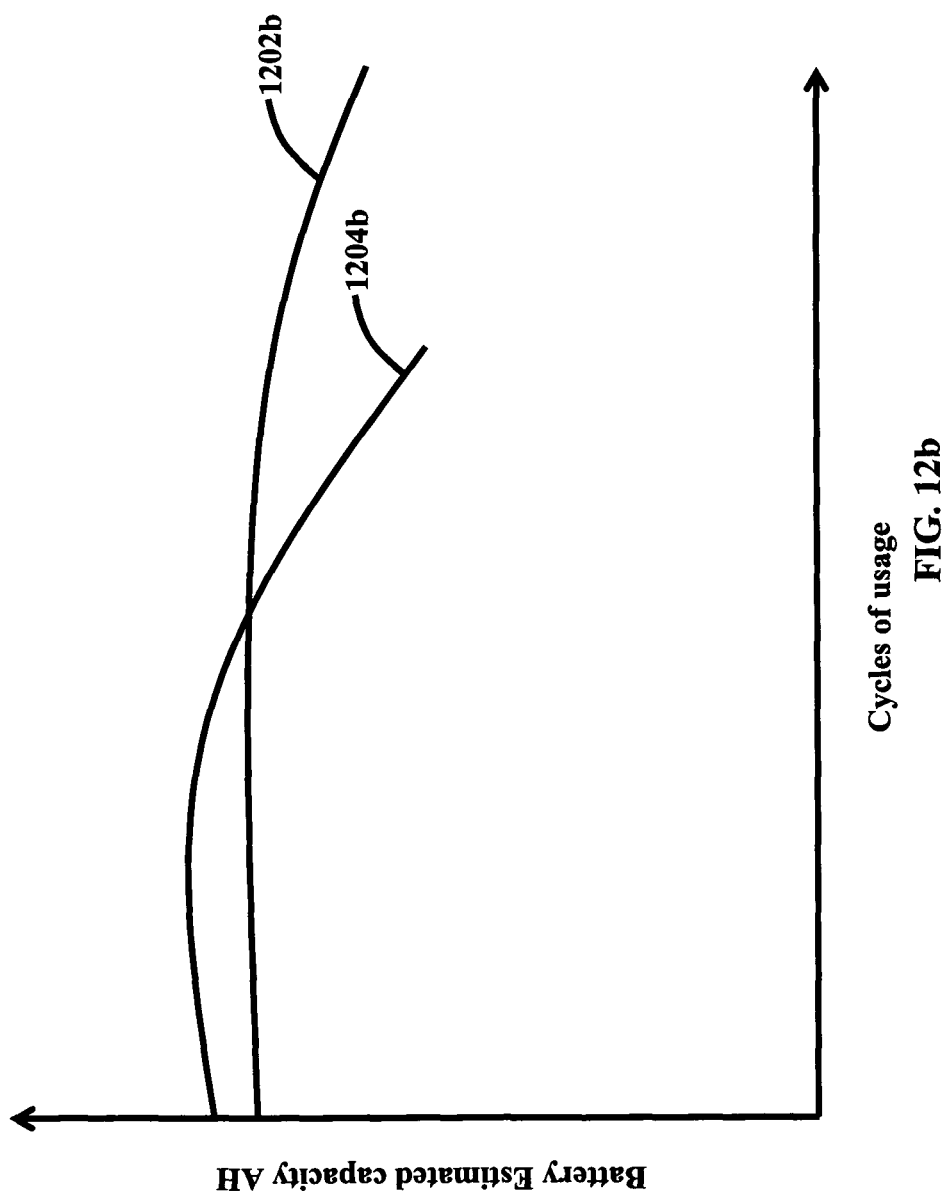
FIG. 12*b* illustrates ESS capacity pattern, in accordance with an embodiment.

FIGS. 12a, 12b and 12c illustrate energy usage pattern, capacity pattern, and vehicle usage pattern, in accordance with an embodiment.

FIG. 12a illustrates energy usage pattern from ESS 104, in accordance with an embodiment. In FIG. 12a energy usage in Wh/Km is plotted against cycles of usage, wherein cycles of usage represents number of charge or discharge cycles. Band 1202a is a reference band that represents predetermined energy usage and line 1204a represents actual energy usage from ESS 104 over cycles of usage. The graph indicates that user of vehicle tends to use less energy during his drives. This energy usage pattern can be used as reference for diagnosis when a user of the vehicle complains of a low range or change in vehicle behaviour.

FIG. 12b illustrates ESS 104 capacity pattern, in accordance with an embodiment. In FIG. 12b line 1202b represents predetermined capacity of ESS 104 over cycles of usage, whereas 1204b represents actual capacity of ESS 104 over cycles of usage. The deviation between the two lines 1202b and 1204b is an indication of deterioration of ESS 104, based on which actions can be taken to rectify the condition associated with the ESS 104 if required.

FIG. 12c illustrates vehicle usage pattern, in accordance with an embodiment. The graph represents kilometers driven in each drive before the user of the vehicle plugs the ESS 104/vehicle in for charging. The graph indicates that the user uses the vehicle for very short distances before putting the vehicle for charging.

It will be clear to a person skilled in the art that pattern other than the ones mentioned above can be derived by collecting data from ESS 104 and ECS 106.

Determining Whether Modification of the Instructions is Required

Figure 13:
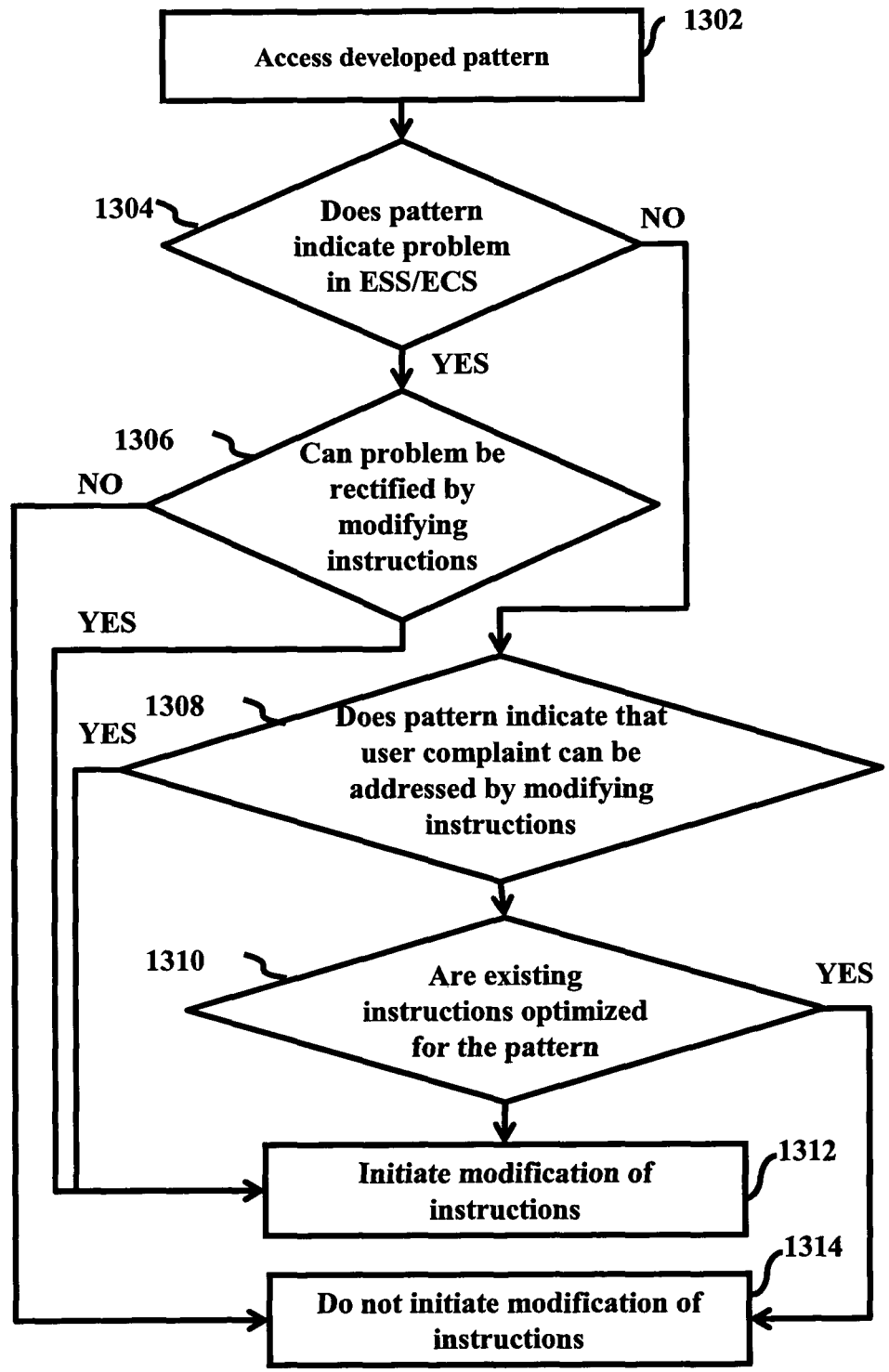
FIG. 13 is a flow chart illustrating a method of determining whether modifications to the instructions in the EMS are required; in accordance with an embodiment.

The patterns that are developed can be used to determine whether modifications to the instructions in the EMS 108 are required. FIG. 13 is a flow chart illustrating a method of determining whether modifications to the instructions in the EMS 108 are required. The method includes, at step 1302, accessing one or more patterns that have been developed. In an embodiment, the patterns are compared with reference patterns. The comparison is used to determine whether the pattern indicate problem associated with one or more of the ESS 104 and ECS 106, at step 1304.

Figure 14:
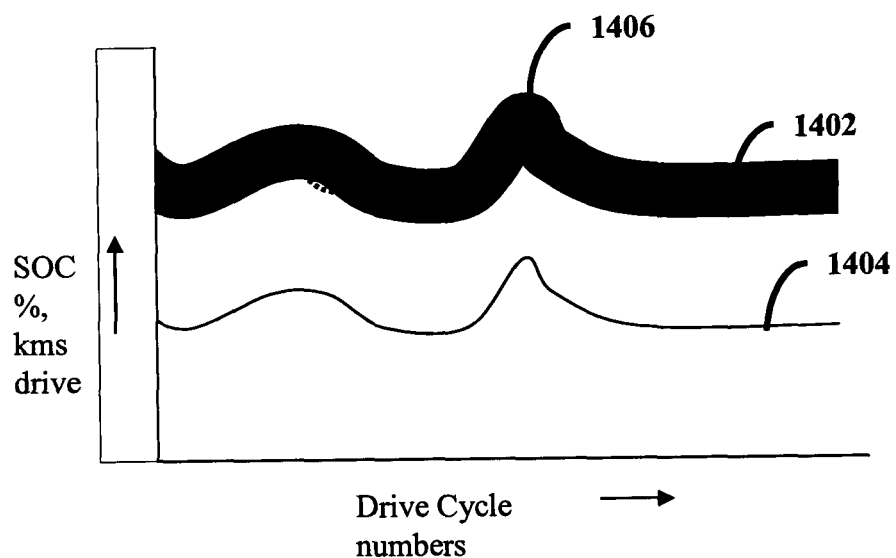
FIG. 14 is a graph illustrating drive pattern, in accordance with an embodiment.

FIG. 14 is a graph illustrating drive pattern, in accordance with an embodiment. In this embodiment drive pattern of energy system 102 is generated, wherein the energy system 102 is an electric vehicle. The drive pattern is generated to resolve a user's complaint that the electric vehicle is providing lower driving range. To address the complaint, a pattern 1402 showing the kms driven in each drive is generated using the data collected. Further, a pattern 1404 of the charge consumption over the corresponding drive cycles is also generated using the data collected. Additionally, based on the pattern of charge energy consumption, the system also generates a pattern 1406 of the expected driving range. This is a 'band' of values as shown in the pattern 1406. By comparing the 'expected' range pattern and the actual range achieved, it is seen that the performance is well in the expected range. Hence, the reason for the customer complaint could be attributed to user perception of the rate at which the fuel gauge appears to be dropping in the vehicle. This complaint may be resolved by reconfiguring the fuel gauge.

Figure 15:
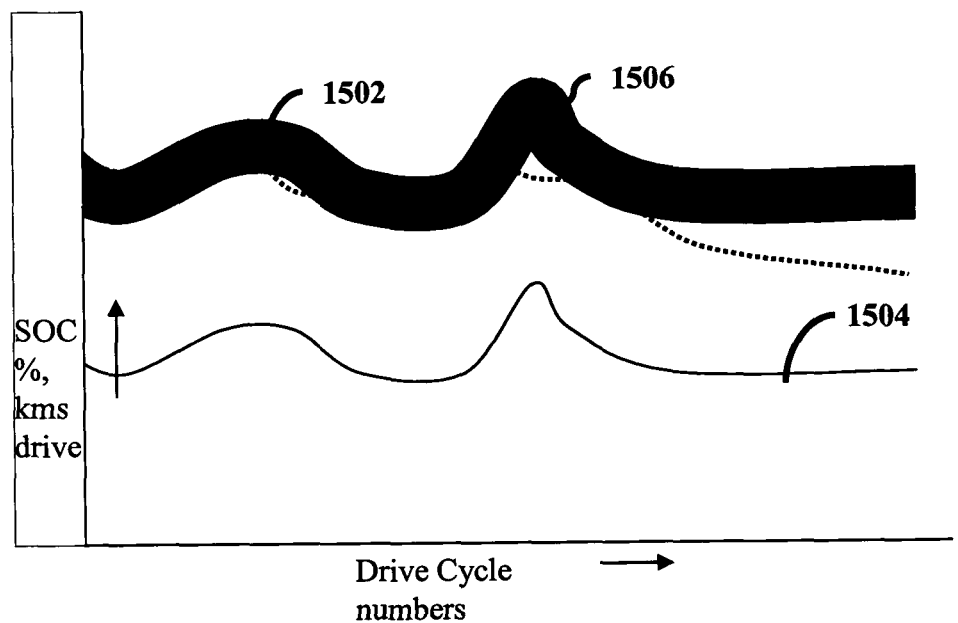
FIG. 15 is a graph illustrating drive pattern, in accordance with an embodiment.

There could be complaints which may be solved by modifying instructions in the EMS 108. One such example is provided using FIG. 15. FIG. 15 is a graph illustrating drive pattern, in accordance with an embodiment. In this embodiment drive pattern of energy system 102 is generated, wherein the energy system 102 is an electric vehicle. The drive pattern is generated to resolve a user's complaint that the electric vehicle is providing lower driving range. To address the complaint, a pattern 1502 showing the kms driven in each drive is generated using the data collected. Further, a pattern 1504 of the charge consumption over the corresponding drive cycles is also generated using the data collected. Additionally, based on the pattern of charge energy consumption, the system also generates a pattern 1506 of the expected driving range. This is a 'band' of values as shown in the pattern 1506. By comparing the 'expected' range pattern and the actual range achieved, it is seen that drive range achieved during the recent drives is clearly below expectations. It is clear that there is a problem with either the ESS 104 or the ECS 106. Subsequently a pattern is generated to check the ESS 104. Subsequently, in an embodiment, if it is determined that the problem is not corresponding to ESS 104, patterns are generated to check different subsystems of ECS 106. In case an issue corresponding to drive range is attributed to a problem such as an ECS 106 subsystem such as drive system drawing more power due to brake jamming, would require a service engineer's visit to rectify the problem, and may not be solved by modifying instructions in the EMS 108.

If, at step 1304, it is determined that there is a problem associated with one or more of ESS 104 and ECS 106, then, at step 1306, it is checked whether the problem can be rectified by modifying instructions in the EMS 108. If at step 1306 it is determined that the problem can be addressed by modifying instructions, then at step 1312, modification of instructions is initiated. Alternatively, if at step 1304, it is determined that the pattern does not exhibit any problem associated with one or more of ESS 104 and ECS 106, then, at step 1308, pattern is analyzed to determine whether any complaint made by the user of the energy system 102 can be addressed by modifying instructions. If at step 1308, it is determined that user complaint can be addressed by modifying instructions, then modification of instruction is initiated it step 1312. However, if at step 1308, it is determined that user complaint cannot be addressed by modifying instructions, then at step 1310, the instructions are analyzed in light of the pattern to determine whether the instructions are optimized to the pattern exhibited.

Figure 16:
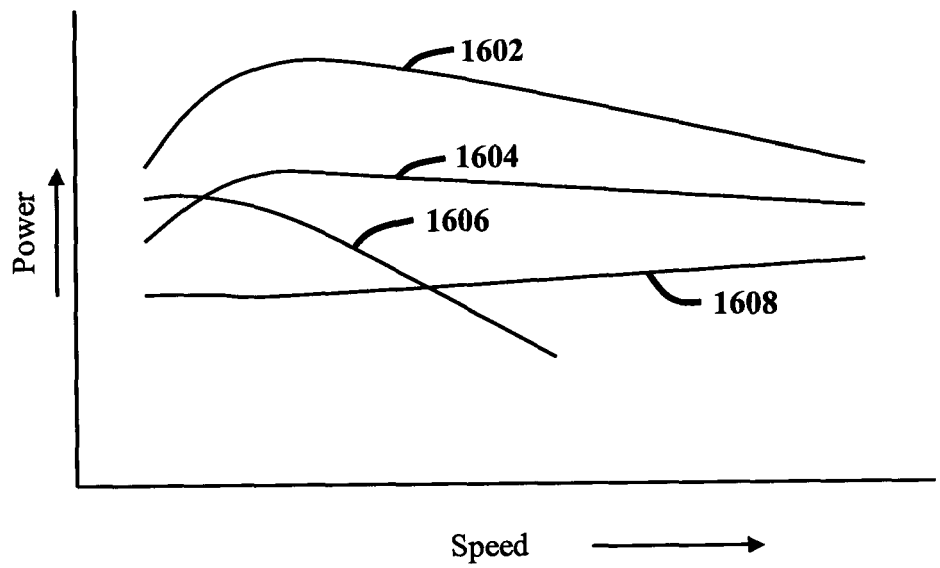
FIG. 16 is a graph illustrating driving pattern, in accordance with an embodiment.

An example of analyzing instructions in light of the pattern is provided using FIG. 16. FIG. 16 is a graph illustrating driving pattern, in accordance with an embodiment. In this example the energy system 102 is an electric vehicle. The graph shows several plots of power at different speeds. The line 1602 shows the maximum power delivered by the vehicle at different speeds. In an electric vehicle using all power available results in reduced driving range. Hence, the EMS 108 is programmed to allow usage of a certain amount of power based on the speed, acceleration and range specifications of the vehicle. Line 1604 shows the way such a power map is programmed in the vehicle. These power maps are pre-programmed into the vehicles at the factory. However, it is possible that different users have different requirements based on usage patterns. For example user 1 as shown by the line 1606 has a typical drive pattern in which he needs more power at low speeds but does not drive to full speeds. This is typical of someone living in a hilly terrain. He needs higher power at low speeds to overcome the slopes. However, due to the type of terrain, he does not need high speeds. The DPS 110 analyses actual drive information gathered from his drives and maps his driving pattern. This pattern can generate a new map to be programmed into the car's EMS. This result in a drive map suited to his usage needs. In a similar way we can look at another user as represented by line 1608. This user drives in flatter roads and is used to driving up to full speed quite often. The frequency of such usage can be mapped by the DPS 110. The DPS 110 can generate a power map suitable for this user. His acceleration can be reduced and low speed power can be reduced to allow better utilization of the energy. These are two possible examples. Many such separate requirements can be met by the system 100.

If the existing instructions are not optimized with the pattern, then the same is optimized by initiating modification of instructions at step 1312.

The instructions can be modified to temporarily shut down one or more sub systems of the ECS 106. It may be noted that in case of a situation wherein the energy system may have to be recalled, some of the subsystems may be temporarily shut to ensure safety of the user of the energy system 102. Further, shutting down of operation of some of the sub systems may enable a user to use the energy system 102 till fault in the energy system 102 is addressed. Alternatively, performance of one or more subsystems of the ECS 106 may be modified, for example, the performance may be reduced, to ensure safety of the user of the energy system 102. Further, modification of performance of some of the sub systems may enable a user to use the energy system 102 till fault in the energy system 102 is addressed. For example, an energy system 102, such as an electric vehicle may have a faulty design that leads to undesirable acceleration of the vehicle beyond a certain speed. To rectify the fault in the design, the vehicle will have to be recalled. However, till the vehicle is recalled and the fault is rectified, performance of some of the subsystems of the electric vehicle can be modified to ensure that the electric vehicle is not driven beyond a certain speed, thereby ensuring safety of the user of the electric vehicle.

In an embodiment, determining whether modifying of instructions is required is based on the generated pattern and also user's preference on the performance of the energy system 102.

In an embodiment, the user may choose to use energy system 102, such as an electric vehicle in a high performance mode. In the high performance mode, the vehicle would be more responsive to the inputs (ex: accelerator) provided by the user. When the user chooses the mode, the current performance level of the vehicle is determined, and subsequently, it is determined whether the current performance level can deliver the desired performance. If the current performance of the vehicle cannot deliver the desired performance, then instructions are modified to achieve the desired level of performance.

It may be further noted that the desired performance can be, increased efficiency, increased speed, and increased life of energy storage system, among others.

Modifying Instructions in the Energy Management System

In an embodiment, the instructions in the EMS 108 are modified using wireless means. The DPS 110 after determining the instructions to be modified, sends commands to the EMS 108. The commands sent by the DPS 110 are received by the signal transmitting and receiving device 308. Further, the processor 302 executes the commands sent by the DPS 110 to modify the instructions in the EMS 108.

In an embodiment, the instructions to be modified are derived by gathering data from a fleet of energy systems 102. The gathered data is analyzed to determine instructions that are optimized for the energy system exhibiting certain patterns. Further, the instructions in the EMS 108 are modified to follow the most preferred way of carrying out the operation, which is derived from the data gathered from the fleet of energy systems.

In an embodiment, the DPS 110 notifies the user of the energy system 102 regarding modification of the instructions in the EMS 108.

In an embodiment, the DPS 110 modifies the instructions only after receiving permission from the user of the energy system 102 to make modifications to the instructions in the EMS 108.

In an embodiment, the notification is sent to the user's wireless communication device, such as mobile phone, person digital assistant, and personal computer, among others.

In an embodiment, the notification is sent to a communication interface provided in the energy system 102. An example of the same is a dashboard display of a vehicle, in which the vehicle is the energy system 102.

In an embodiment, instructions in the EMS 108 are modified based on the information collected from sources which are external to the energy system 102, such as internet.

In an embodiment, weather information is collected, and based on the weather condition, the ESS 104 is preconditioned.

In an embodiment, preconditioning of ESS 104 include heating or cooling the ESS 104 to an optimum operating temperature, which results in increased range of the vehicle, wherein the vehicle is the energy system 102.

In an embodiment, weather information which includes temperature information in a given location is received by EMS 108. The weather information can be received from an external source (example, a weather database on the internet that provides weather information). This information is used to preheat or pre cool the ESS 104 to an optimum temperature before the vehicle is driven.

In some embodiments, the weather information may be provided by DPS 110 to ESS 104. In some other embodiment, the weather information may be directly retrieved by ESS 104 from an external source.

The environmental conditions in a location in which the vehicle is currently located could be significantly different from the environmental conditions in which the vehicle is driven. For example, when the vehicle is parked in a garage, the external temperature of the vehicle could be around 20 degree Celsius, whereas temperature outside the garage could be −10 degree Celsius. Hence, retrieving weather information from an external source enables effective preconditioning of ESS 104.

In an embodiment a method and system is provided for estimating performance delivered by an ESS 104 beyond the ESS 104 warranty period. The method includes collecting data corresponding to the ESS 104, generating behavioural pattern of the ESS 104 using at least a portion of the collected data, comparing the behavioural pattern with patterns developed using historical data, identifying a pattern among the patterns developed using historical data, wherein the identified pattern is similar to the behavioural pattern of the ESS 104, and estimating the performance delivered by an ESS 104 beyond the ESS 104 warranty period based on performance indicated, post warranty period, in the pattern among the patterns developed using historical data that is similar to the behavioural pattern of the ESS 104.

In another embodiment a method and system is provided for enhancing performance that can be delivered by an ESS 104 beyond the ESS 104 warranty period. The method includes estimating performance delivered by the ESS 104 beyond the ESS 104 warranty period, identifying adaptations to be made to enhance the performance of the ESS 104, and making adaptations to the ESS 104, thereby enhancing the performance that can be delivered by an ESS 104 beyond the ESS 104 warranty period.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein include technique for identifying at a remote location, at least one condition associated with an energy system, and technique for adapting control in an energy system. Therefore, it is understood that the embodiments disclosed include a program and a computer readable medium having data stored therein. The computer readable medium can contain program code for implementing one or more steps of the disclosed methods. The disclosed embodiments also include a server or any suitable programmable device configured to execute that program code. One or more of the disclosed methods can be implemented through or together with a software program written in, e.g., very high speed integrated circuit hardware description language (VHDL) or another programming language. Further, the disclosed methods can be implemented by one or more software modules being executed on at least one hardware device. The at least one hardware device can include any kind of portable device that can be programmed. The at least one hardware device may also include devices that can be programmed (e.g., a hardware device like an ASIC, a combination of hardware and software devices, such as an ASIC and an FPGA, or at least one microprocessor and at least one memory with software modules located therein). The methods described herein can be implemented partly in hardware and partly in software. Alternatively, embodiments may be implemented on different hardware devices, e.g. using a plurality of CPUs.

The foregoing description of the specific embodiments will so fully reveal the general nature of the embodiments disclosed herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments disclosed herein have been described in terms of preferred embodiments, those skilled in the art will recognize that the embodiments disclosed herein can be practiced with modification within the spirit and scope of the embodiments as described herein.

We claim:

1. A method for adapting control in an energy system which is at least partially powered by electricity, wherein said energy system comprises an energy storage system capable of storing electric energy, an energy consumption system capable of consuming, at least partially, the electric energy stored in said energy storage system, and an energy management system comprising instructions for managing said energy storage system and said energy consumption system, said method comprising:
    gathering data, in real time, relating to at least one of said energy storage system and said energy consumption system, wherein said gathered data comprises temperature of at least one of said energy storage system and said energy consumption system in combination with at least one of voltage of said energy storage system, water level in said energy storage system, current of said energy storage system, power of said energy storage system, deviation of said energy storage system, energy of said energy storage system, and impedance of said energy storage system;
    computing at least a parameter based on the gathered data, wherein the parameter is associated with said energy storage system, wherein the parameter is related to at least one condition of the energy system;
    comparing the at least one parameter with at least corresponding reference data;
    determining by the energy management system, a deviation of the parameter from the reference data, based on the comparison, wherein the determined deviation is sent to a data processing system at a remote location, further wherein the data processing system is capable of sending commands to at least one of a plurality of subsystems of the energy system from the remote location;
    generating at least one of a charge pattern, a temperature pattern, a capacity pattern, a state of health pattern, in real time, from the gathered data, wherein said pattern is compared to at least historical data, so as to identify a pattern developed using historical data, the identified pattern being similar to the pattern of the energy storage system;
    determining whether modification of the instructions in the energy management system is required based on said pattern, wherein said determination is based on said pattern and user's preference on performance of said energy system; and
    modifying the instructions in said energy management system if said modification of the instructions in said energy management system is required.

2. The method according to claim 1, wherein said generating of said pattern from said gathered data further comprises developing at least one of an energy storage system charging pattern, an electric energy usage pattern, a drive pattern of said energy system, a usage pattern of said energy system, a driving speed pattern of said energy system, a regenerative energy pattern, a temperature pattern, a usage pattern of heating ventilation air conditioning, a pattern of state of health of said energy storage system and a pattern of capacity of said energy storage system.

3. The method according to claim 1, further comprising gathering data which is external to said energy system.

4. The method according to claim 1, further comprising preconditioning said energy storage system by at least one of heating and cooling said energy storage system, based on the gathered data.

5. The method according to claim 1, wherein the data is related to a source of electricity used for recharging said energy storage system.

6. The method according to claim 1, further comprising gathering data relating to at least one of said energy storage system and said energy consumption system from a fleet of energy systems.

7. The method according to claim 6, further comprising modifying instructions in said energy management system based on the data gathered from the fleet of energy systems.

8. The method according to claim 1, wherein modifying the instructions in said energy management system comprises modifying the instruction to enable shutting down or modifying performance of one or more subsystems of said energy consumption system.

9. A system for adapting control in an energy system which is at least partially powered by electricity, wherein said energy system comprises an energy storage system capable of storing electric energy, an energy consumption system capable of consuming, at least partially, the electric energy stored in said energy storage system, said system comprising an energy management system and a data processing system, wherein said energy management system and said data processing system are configured to:
  gather data, in real time, relating to at least one of said energy storage system and said energy consumption system, wherein said gathered data comprises temperature of said at least one of said energy storage system and said energy consumption system in combination with at least one of voltage of said energy storage system, water level in said energy storage system, current of said energy storage system, power of said energy storage system, deviation of said energy storage system, energy of said energy storage system, and impedance of said energy storage system;
  compute at least a parameter based on the gathered data, wherein the parameter is associated with said energy storage system, wherein the parameter is related to at least one condition of the energy system;
  compare the at least one parameter with at least corresponding reference data;
  determine a deviation of the parameter from the reference data, based on the comparison, wherein the determined deviation is sent to the data processing system at a remote location, further wherein the data processing system is capable of sending commands to at least one of a plurality of subsystems of the energy system from the remote location;
  generate at least one of a charge pattern, a temperature pattern, a capacity pattern, a state of health pattern, in real time, from the gathered data, wherein said pattern is compared to at least historical data, so as to identify a pattern developed using historical data, the identified pattern being similar to the pattern of the energy storage system;
  determine whether modification of the instructions in the energy management system is required based on said pattern, wherein said determination is based on said pattern and user's preference on performance of said energy system; and
  modify instructions in said energy management system if said modification of the instructions in said energy management system is required.

10. The system according to claim 9, wherein at least one of said energy management system and said data processing system is configured to develop at least one of an energy storage system charging pattern, an electric energy usage pattern, a drive pattern of said energy system, a usage pattern of said energy system, a driving speed pattern of said energy system, a regenerative energy pattern, a temperature pattern, a usage pattern of heating ventilation air conditioning, a pattern of state of health of said energy storage system and a pattern of capacity of said energy storage system.

11. The system according to claim 9, is further configured to gather data which is external to said energy system.

12. The system according to claim 9, wherein the system is configured to precondition said energy storage system by at least one of heating and cooling said energy storage system, based on the gathered data.

13. The system according to claim 9, wherein the system is configured to gather data related to a source of electricity used for recharging said energy storage system.

14. The system according to claim 9, wherein the system is configured to gather data relating to at least one of said energy storage system and said energy consumption system from a fleet of energy systems.

15. The system according to claim 14, wherein the system is configured to modify instructions in said energy management system based on the data gathered from the fleet of energy systems.

16. The system according to claim 9, wherein the system is configured to modify instructions in said energy management system to enable shutting down or modifying performance of one or more subsystems of said energy consumption system.

* * * * *